(12) United States Patent
Gupta et al.

(10) Patent No.: US 12,189,497 B2
(45) Date of Patent: Jan. 7, 2025

(54) TECHNIQUE TO STORE AND RAPIDLY HYDRATE HIGH FREQUENCY SNAPSHOTS ON OBJECT STORAGE

(71) Applicant: Nutanix, Inc., San Jose, CA (US)

(72) Inventors: Abhishek Gupta, Ghaziabad (IN); Ajaykumar Rajubhai Bhammar, Gujarat (IN); Akshay Pandita, Jammu and Kashmir (IN); Bhoomi Sawant, Punjab (IN); Brajesh Kumar Shrivastava, Bihar (IN); Deepak Narayan, Kerala (IN); Prachi Gupta, Ghaziabad (IN); Siddhant Meshram, Maharashtra (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/227,217

(22) Filed: Jul. 27, 2023

(65) Prior Publication Data
US 2024/0272991 A1    Aug. 15, 2024

(30) Foreign Application Priority Data
Feb. 11, 2023   (IN) ............................. 202341008980

(51) Int. Cl.
G06F 16/00 (2019.01)
G06F 11/14 (2006.01)
G06F 16/27 (2019.01)

(52) U.S. Cl.
CPC ......... G06F 11/1469 (2013.01); G06F 16/27 (2019.01); G06F 2201/84 (2013.01)

(58) Field of Classification Search
CPC ............................ G06F 16/27; G06F 11/1469
(Continued)

(56) References Cited

U.S. PATENT DOCUMENTS 8,549,518 B1 * 10/2013 Aron .................... G06F 9/45558
                                                              718/1
8,601,473 B1 * 12/2013 Aron ..................... G06F 3/0638
                                                              718/1
(Continued)

OTHER PUBLICATIONS

Cano, Ignacio, "Curator: Self-Managing Storage for Enterprise Clusters" University of Washington; published Mar. 2017; pp. all.
(Continued)

Primary Examiner — Alexandria Y Bromell
(74) Attorney, Agent, or Firm — Cesari and McKenna, LLP

(57) ABSTRACT

A technique enables recovery of failover data used to generate one or more High Frequency Snapshots (HFSs) at a source and replicated to a target for storage and recovery. The target is illustratively an intermediary repository embodied as a long-term storage service (LTSS) configured to organize and store the HFSs as recovery points (RPs) in an object store. The LTSS stores a HFS identifier (ID), a logical offset in an object of the object store storing data of the HFS, and a logical timestamp associated with each replicated HFS as a key of a segment descriptor in a key-value database configured to store metadata describing the failover data of the HFS stored as one or more objects in the object store. Upon recovery of the failover data, the technique enables identification of the HFS stored in the object store and creation of a HFS index metadata structure (B+ tree) to extract the identified HFS as a RP.

33 Claims, 9 Drawing Sheets

(58) Field of Classification Search
USPC .......................................................... 707/624
See application file for complete search history.

(56) References Cited

U.S. PATENT DOCUMENTS

| | | | | |
|---|---|---|---|---|
| 8,850,130 | B1* | 9/2014 | Aron | G06F 3/0685 |
| | | | | 711/150 |
| 8,863,124 | B1* | 10/2014 | Aron | G06F 9/5061 |
| | | | | 718/1 |
| 9,009,106 | B1* | 4/2015 | Aron | G06F 3/065 |
| | | | | 707/610 |
| 9,069,708 | B2* | 6/2015 | Gill | G06F 11/1438 |
| | | | | 707/707 |
| 9,336,132 | B1* | 5/2016 | Aron | G06F 3/067 |
| | | | | 707/707 |
| 9,652,265 | B1* | 5/2017 | Narayanasamy | G06F 13/10 |
| | | | | 707/707 |
| 9,747,287 | B1* | 8/2017 | Bhardwaj | G06F 3/0631 |
| | | | | 707/707 |
| 9,772,866 | B1* | 9/2017 | Aron | G06F 9/45558 |
| | | | | 707/707 |
| 11,436,097 | B1 | 9/2022 | Kumar et al. | |
| 11,575,745 | B2* | 2/2023 | Tatiparthi | G06F 9/45558 |
| | | | | 707/707 |
| 2019/0163581 | A1* | 5/2019 | Sadavarte | G06F 11/2097 |
| | | | | 707/707 |
| 2019/0370124 | A1* | 12/2019 | Sadavarte | G06F 11/1446 |
| | | | | 707/707 |
| 2022/0309010 | A1 | 9/2022 | Jiang et al. | |
| 2022/0374316 | A1 | 11/2022 | Kumar | |
| 2022/0398163 | A1 | 12/2022 | Bezbaruah et al. | |
| 2023/0029677 | A1 | 2/2023 | Gupta et al. | |
| 2023/0079621 | A1 | 3/2023 | Gupta et al. | |

OTHER PUBLICATIONS

Citrix XenDesktop 7.1 on Microsoft Hyper-V Server 2012 R2 on Nutanix Virtual Computing Platform Solution Design Citrix Validated Solutions, Jun. 25, 2014, 95 pages.

Poitras, Steven "The Nutanix Bible" from http:/stevenpoitras.com/the-nutanix-bible/ Oct. 15, 2013 (Publication date based on indicated capture date by Archive.org first publication date unknown) pp. all.

Poitras, Steven "The Nutanix Bible—Classic Edition" from https:/nutanixbible.com/, dated Nov. 29, 2023, 276 pages.

VMware Manual—vCenter Server and Host Management, Update 1, VMware vSphere 7.0, VMware ES, Xi 7.0, vCenter Server 7.0, Modified on Nov. 25, 2020, 203 pages.

* cited by examiner

TECHNIQUE TO STORE AND RAPIDLY HYDRATE HIGH FREQUENCY SNAPSHOTS ON OBJECT STORAGE

CROSS-REFERENCE TO RELATED APPLICATION

The present application claims the benefit of India Provisional Patent Application Serial No. 202341008980, which was filed on Feb. 11, 2023, by Abhishek Gupta, et al. for TECHNIQUE TO STORE AND RAPIDLY HYDRATE HIGH FREQUENCY SNAPSHOTS ON OBJECT STORAGE, which is hereby incorporated by reference.

BACKGROUND

Technical Field

The present disclosure relates to archival of data and, more specifically, to efficient indexing of snapshot failover data in an archival storage system.

Background Information

File systems are primarily configured to process (i.e., store and retrieve) active input/output (I/O) data accesses to a virtual disk (vdisk) issued by, e.g., a user application executing in a virtual machine of a storage system. The user application and its processed data accesses may be designated as a category of data for failover and protected by generating one or more snapshots. However, such file systems are not generally configured to maintain large quantities of snapshots for long-term storage and retention in an archival storage system because they are primarily designed for rapid application of changes (e.g., as "live" data) to support immediate access requests. Accordingly, the snapshots may be periodically replicated to backup/archival storage systems associated with the active file systems so that the failover data may be available for retrieval according to a Recovery Point Objective (RPO) that satisfies tolerable data loss of, e.g., 1 hour, to support restore operations. Yet for some critical restore operations, it is desirable to shorten the tolerable data loss, e.g., to minutes or seconds, and enable faster recovery of protected failover data.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a technique configured to enable recovery of failover data (e.g., data processed by a user application) at an on-premises cluster (e.g., source) from one or more High Frequency Snapshots (HFSs) replicated to a cloud cluster (e.g., target) for storage and recovery in a backup/archival and/or disaster recovery (DR) environment. The target is illustratively an intermediary repository embodied as a long-term storage service (LTSS) configured to organize and store the HFSs as recovery points (RPs) in cloud storage, such as an object store. According to the technique, the LTSS stores a HFS identifier (ID), a logical timestamp (e.g., a timestamp corresponding to a time when the HFS was taken) and a logical offset (e.g., an offset in an object of the object store storing data of the HFS) associated with each replicated HFS as a key of a segment descriptor in a key-value database configured to store metadata describing the failover data of the HFS stored as a whole or part of one or more objects in the object store. Upon recovery of the user application in response to, e.g., a disaster, the technique enables identification of the HFS stored in the object store and creation of a searchable HFS index metadata structure (e.g., B+ tree) for locating and retrieving (extracting) the identified HFS as a RP. Illustratively, LTSS uses the HFS ID and logical timestamp to create the index metadata structure of segment descriptors identifying and locating the HFS within the object store. The HFS index metadata structure is then used to hydrate and create the RP used to reconstitute the user application at the source.

Advantageously, the technique enables rapid recovery of failover data within substantially short Recovery Point Objective (RPO) intervals, e.g., minutes or seconds using HFS as RPs, to realize a Recovery Time Objective (RTO) of nearly zero (e.g., an apparent immediate or instant recovery time). Each RP is replicated and updated using incremental snapshot replication with HFS every RPO interval to reduce an amount of data loss for the recovered application. Further, multiple overwrites of data may be pruned and garbage collected in the background.

DESCRIPTION

Figure 1:
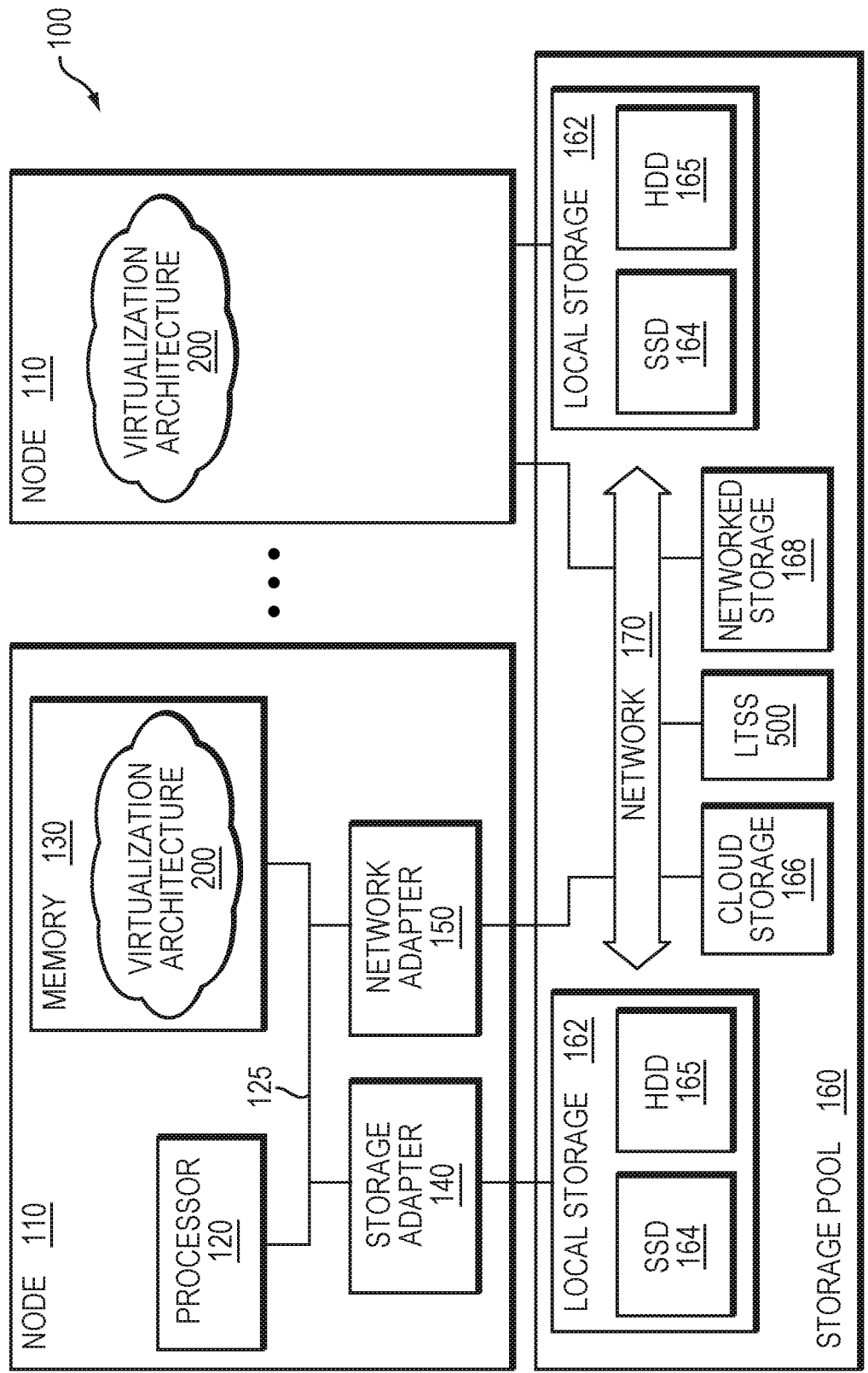
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information. i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over network 170, which is illustratively an Ethernet local area network (LAN). The network adapter 150 may thus be embodied as a network interface card having the mechanical, electrical and signaling circuitry needed to connect the node 110 to the network 170. The multiple tiers of SOCS include storage that is accessible through the network 170, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. As described herein, a long-term storage service (LTSS 500) of an archival storage system provides storage of large numbers (amounts) of point-in-time images or recovery points (i.e., snapshots) of application workloads on an object store. Communication over the network 170 may be affected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS), as well as specialized application program interfaces (APIs) may also be advantageously employed.

The main memory 120 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes, and programs being embodied as logic, components, and/or modules consisting of hardware, software, firmware, or combinations thereof.

Figure 2:
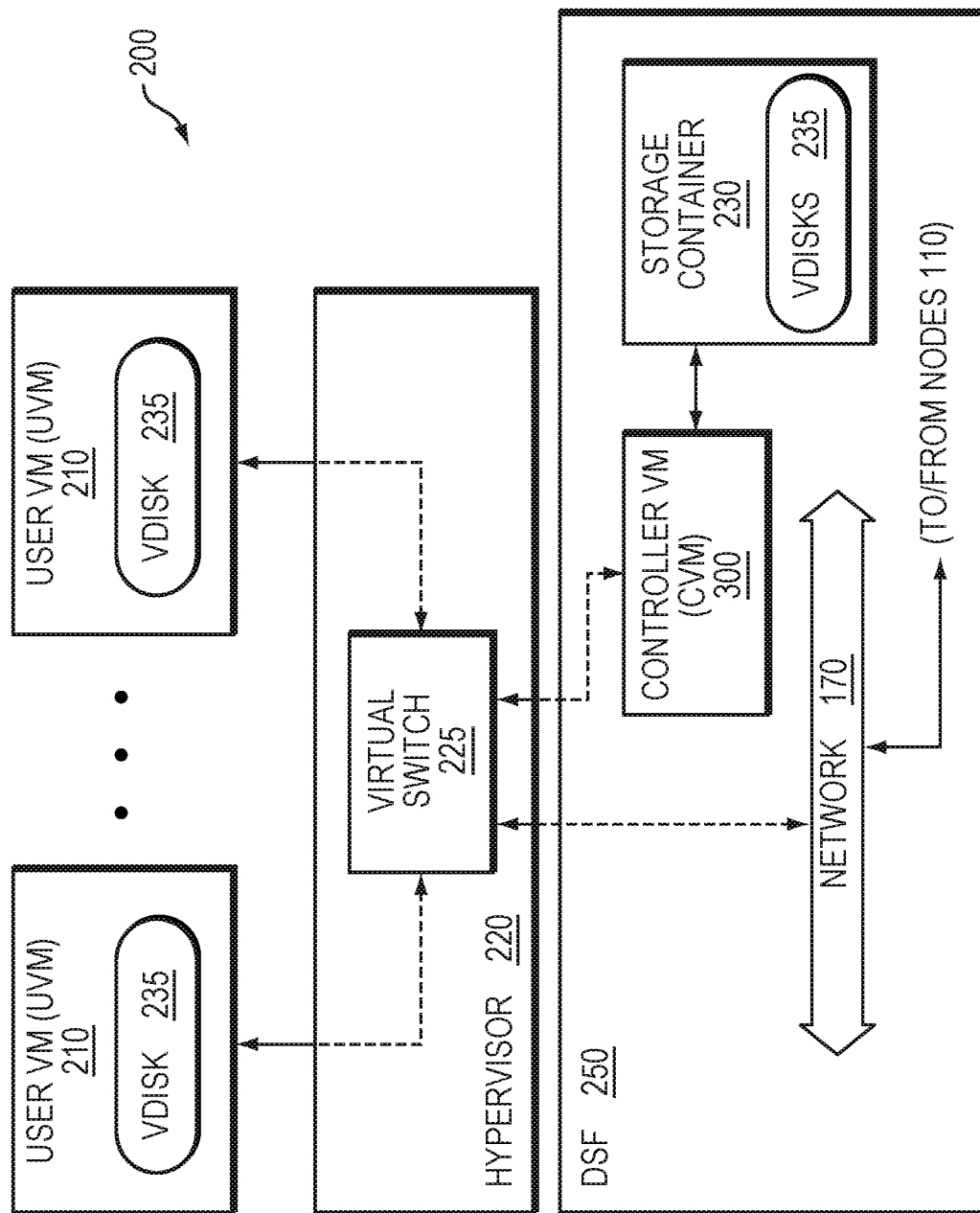
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V. RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyperconvergence architecture wherein the nodes provide both storage and computational resources available cluster wide.

The client software (e.g., one or more user applications) running in the UVMs 210 may access the DSF 250 using filesystem protocols, such as the network file system (NFS) protocol, the common internet file system (CIFS) protocol and the internet small computer system interface (ISCSI) protocol. Operations on these filesystem protocols are interposed at the hypervisor 220 and redirected (via virtual switch 225) to the CVM 300, which exports one or more iSCSI. CIFS, or NFS targets organized from the storage objects in the storage pool 160 of DSF 250 to appear as disks to the UVMs 210. These targets are virtualized. e.g., by software running on the CVMs. and exported as virtual disks (vdisks) 235 to the UVMs 210. In some embodiments, the vdisk is exposed via ISCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an ISCSI, CIFS, or NES request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NES client software may be employed to convert the SCSI-formatted UVM request into an appropriate iSCSI, CIFS or NFS formatted request that can be processed by the CVM 300. As used herein, the terms ISCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably, the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the cluster 100 for processing. Specifically, the IP-based storage protocol request is forwarded by the virtual switch 225 to a physical switch (not shown) for transmission over network 170 to the other node. The virtual switch 225 within the hypervisor 220 on the other node then forwards the request to the CVM 300 on that node for further processing.

Figure 3:
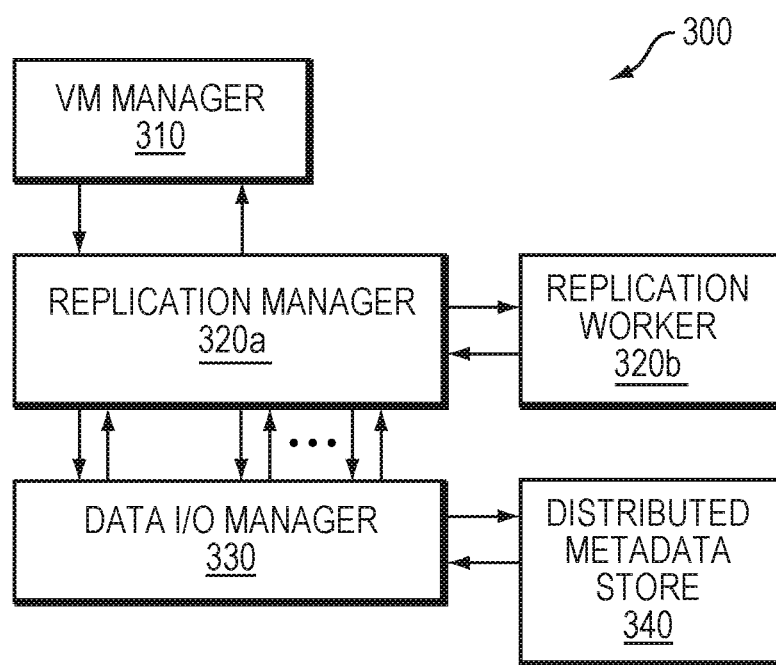
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack running in a user space of the operating system of the CVM to provide storage and I/O) management services within DSF 250. The processes include a virtual machine (VM) manager 310 configured to manage creation, deletion, addition, and removal of virtual machines (such as UVMs 210) on a node 110 of the cluster 100. For example, if a UVM fails or crashes, the VM manager 310 may spawn another UVM 210 on the node. A replication manager 320*a* is configured to provide replication and disaster recovery capabilities of DSF 250. Such capabilities include migration/failover of virtual machines and containers. In an embodiment, the replication manager 320*a* may interact with one or more replication workers 320*b*. A data I/O manager 330 is responsible for all data management and I/O operations in DSF 250 and provides a main interface to/from the hypervisor 220. e.g., via the IP-based storage protocols. Illustratively, the data I/O manager 330 presents a vdisk 235 to the UVM 210 in order to service I/O access requests by the UVM to the DES. In an embodiment, the data I/O manager 330 and replication manager 320 cooperate with DSF 250 to schedule and generate, i.e., provide support for, snapshots, which are point-in-time copies of storage objects, such as files, LUNs and/or vdisks. A distributed metadata store 340 stores and manages all metadata in the node/cluster, including metadata structures that store metadata used to locate (map) the actual content of vdisks on the storage devices of the cluster.

Figure 4:
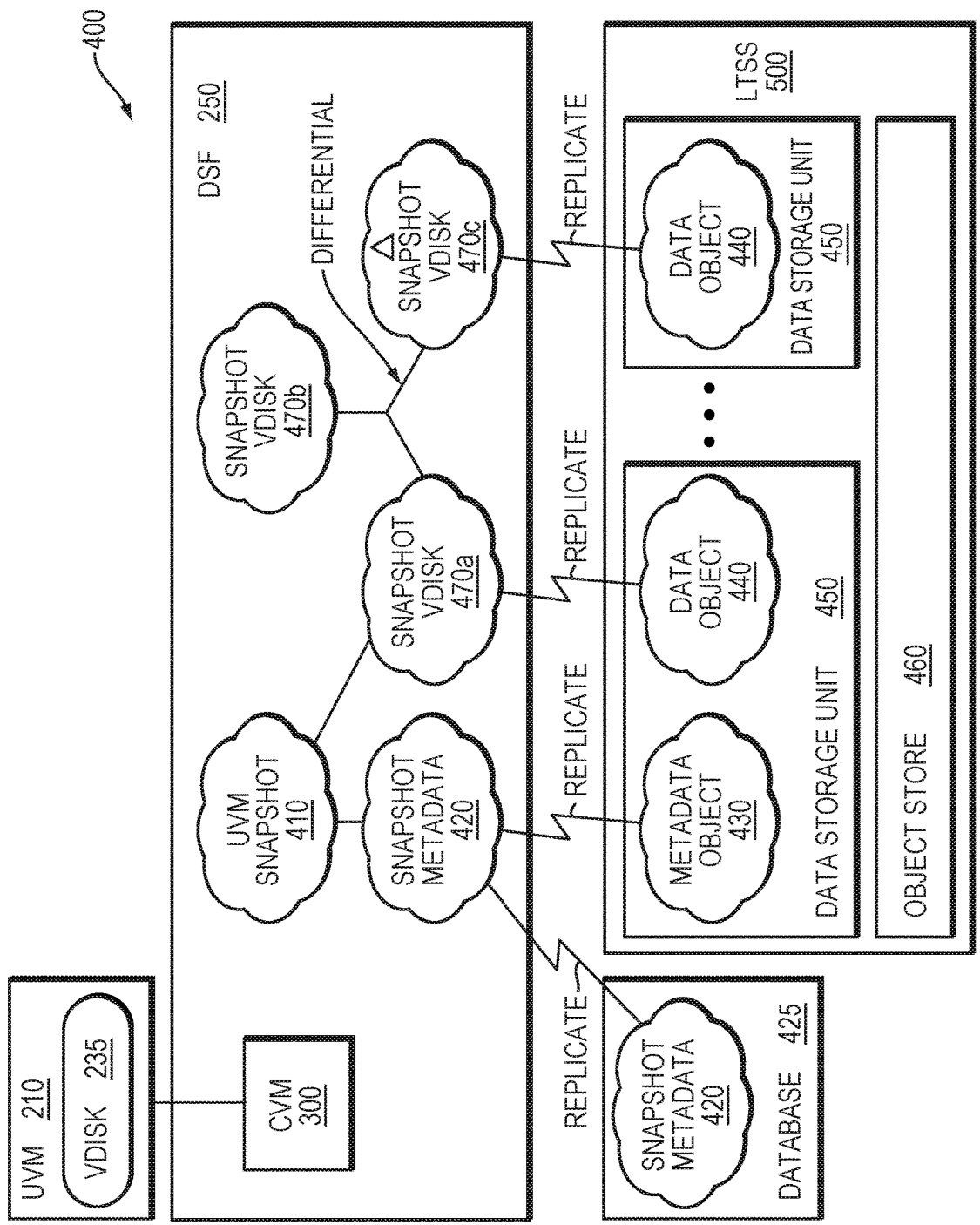
FIG. 4 is a block diagram of an exemplary data replication environment configured to replicate snapshots for storage to a long-term storage service (LTSS) of an archival storage system.

The embodiments described herein are related to an indexing technique configured to provide an index data structure for efficient retrieval of data of a snapshot from the LTSS of the archival storage system. FIG. 4 is a block diagram of an exemplary data replication environment 400 configured to replicate snapshots for storage to the LTSS of the archival storage system. The architecture of LTSS 500 is configured to process large amounts of point-in-time images or recovery points (i.e., snapshots) of application workloads for storage on an object store 460 (archival storage vendor such as Amazon AWS S3 storage services, Google Cloud Storage, Microsoft Azure Cloud Storage and the like), wherein the workloads are characterized by a logical entity having typed data, e.g., a virtual machine (VM) such as a UVM 210. A client of LTSS 500 may be a distributed file system of a storage system (e.g., CVM 300 of DSF 250) that generates snapshots of the UVM (e.g., data processed by a user application running in the UVM) and replicates the UVM snapshot 410 for storage in the object store 460. Replication, in this context, is directed to storage devices that exhibit incremental, block-level changes. LTSS 500 is thus a "generic" long-term storage service of an archival/backup storage system from the perspective of the client, i.e., the client flushes (delivers) data blocks of UVM snapshots 410 to the LTSS 500, which organizes the blocks for long-term storage within objects of the object store 460. Each UVM snapshot 410 is generally handled as a data storage unit 450 by LTSS 500.

Illustratively, the content of each UVM snapshot 410 includes snapshot metadata and snapshot data, wherein the snapshot metadata 420 is essentially configuration information describing the logical entity (e.g., UVM 210) in terms of, e.g., virtual processor, memory, network, and storage device resources of the UVM. The snapshot metadata 420 of the UVM 210 is illustratively replicated for storage in a query-able database 425 although, in an embodiment, the snapshot metadata 420 may be further replicated and organized as a metadata object 430 within a configuration namespace (e.g., bucket) of the object store 460 of LTSS 500 for long-term durability and availability. The data of the UVM 210 is virtualized as a disk (e.g., vdisk 235) and, upon generation of a snapshot, is processed as snapshot vdisk 470 of the UVM 210. The snapshot vdisk 470 is replicated, organized, and arranged as one or more data objects 440 of the data storage unit 450 for storage in the object store 460. The data is stored on a storage device of the object store as extents (i.e., contiguous data slices). Each extent of the snapshot vdisk 470 is a contiguous range of address space within a data object 440, wherein the extents are "packed" into the data object 440 and accessible by, e.g., offsets and lengths. Note that a preferred size (e.g., 16 MB) of each data object 440 may be specified by the object store/vendor (e.g., AWS S3 cloud storage) for optimal use of the object store/vendor.

Operationally, the client initially generates a full snapshot (a snapshot referencing all blocks at a point-in-time) of vdisk 235 (e.g., snapshot vdisk 470*a*) and transmits copies (i.e., replicas) of its data blocks to effectively replicate the snapshot vdisk 470*a* to LTSS 500. The snapshot vdisk 470*a* is thereafter used as a reference snapshot for comparison with one or more subsequent snapshots of the vdisk 235 (e.g., snapshot vdisk 470*b*) when computing incremental differences (deltas Δs). To support a Recovery Point Objective (RPO), the client (e.g., CVM 300) generates the subsequent vdisk snapshots 470*b* at predetermined (periodic) time intervals and computes the deltas of these periodically generated snapshots with respect to the reference snapshot. The CVM 300 transmits replicas of data blocks of these deltas as Δ snapshot vdisk 470*c* to LTSS. Note that from the perspective of the CVM 300, the LTSS 500 is a storage entity having an address on the network 170 (or WAN), similar to any networked storage 168. However, unlike networked storage 168, which is generally exposed to (accessed by) the CVM 300 using filesystem protocols such as NFS. CIFS and iSCSI, the LTSS 500 is accessed using specialized application program interfaces (APIs) referred to herein as replication APIs, which have rich descriptive semantics for managing, storing, and retrieving the snapshots retained in the LTSS. For example, a replication API may specify the snapshotted vdisk 470*a* of the logical entity (e.g., UVM 210) as well as information describing the snapshot metadata 420 and snapshot vdisk 470*a* of the entity for locating and storing or retrieving data from the LTSS. The CVM 300 then transmits (replicates) a stream of data blocks of the snapshotted vdisk 470*a* to LTSS 500.

Figure 5:
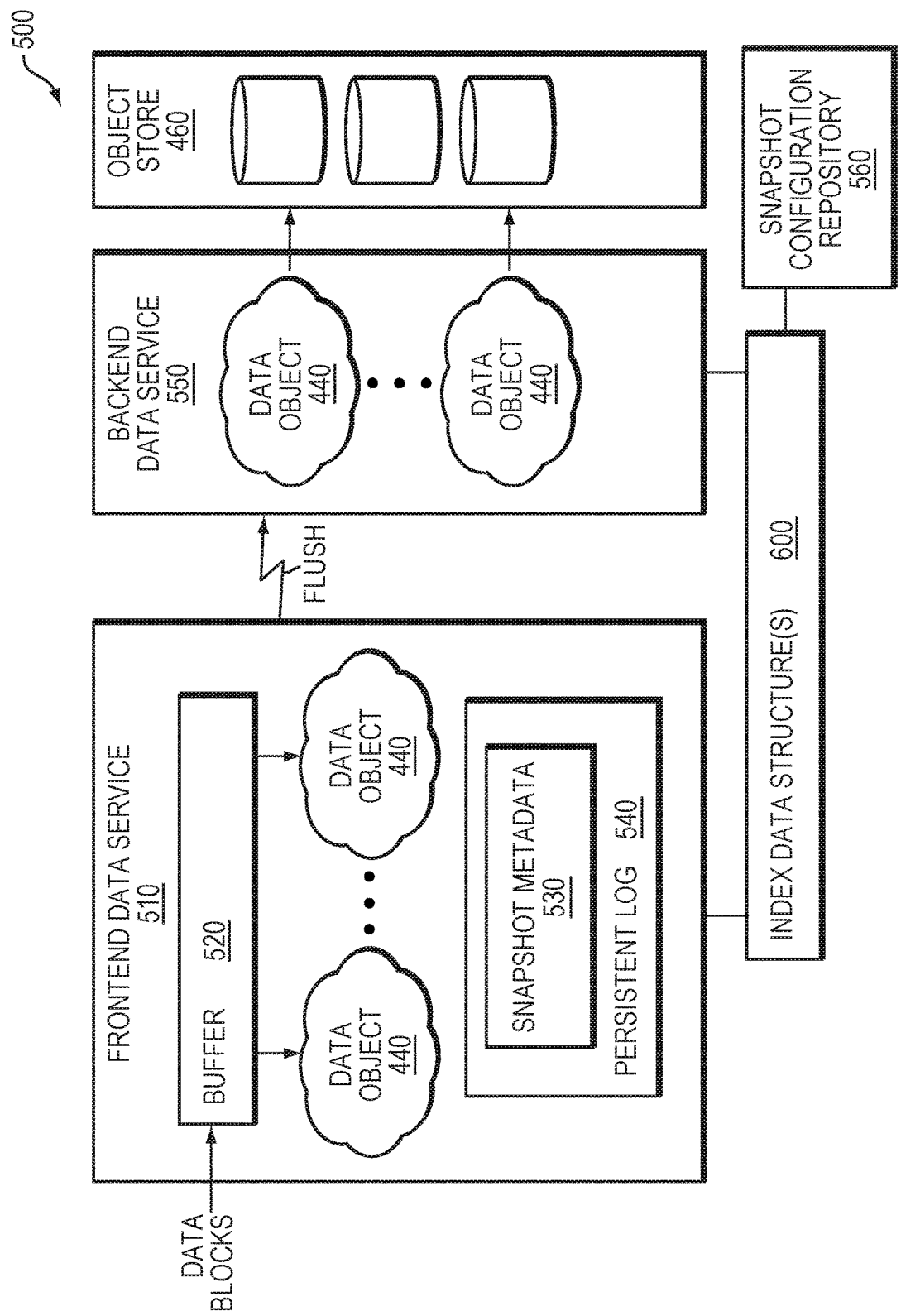
FIG. 5 is a block diagram of the LTSS of the archival storage system.

FIG. 5 is a block diagram of the LTSS 500 of the archival storage system. Illustratively, the LTSS 500 includes two data services (processes): a frontend data service 510 that cooperates with the client (e.g., CVM 300) to organize large amounts of the replicated snapshot data (data blocks) into data objects 440 and a backend data service 550 that provides an interface for storing the data objects 440 in the object store 460. In an embodiment, the LTSS data services/processes may execute on a computing platform at any location (e.g., may be geographically separate from a location of the object store) and is generally "stateless" as all data/metadata are stored on the object store 460. That is, the LTSS is a serverless transactional service that may execute anywhere that has a network connection to the object store and the CVM. Accordingly, the frontend data service 510 and backend data service 550 may run either locally on a processor of a node of an "on-prem" cluster or remotely on a processor of a node of an "in-cloud" cluster. In response to receiving an initial replication API directed to the snapshot vdisk 470*a*, the frontend data service 510 temporarily stores the stream of data blocks of the snapshot vdisk 470*a*, e.g., in a buffer 520 and writes the data blocks into one or more extents (i.e., contiguous, non-overlapping, variable-length regions of the vdisk) for storage in data objects 440 of a preferred size (e.g., 16 MB) as specified by the object store vendor for optimal use. The frontend data service 510 then forwards (flushes) the data objects 440 to the backend data service 550 for storage in the object store 460 (e.g., AWS S3). In response to receiving a subsequent replication API directed to the Δ snapshot vdisk 470*c*, the frontend data service temporarily stores the stream of data blocks of the Δ snapshot vdisk 470*c* in buffer 520, writes those data blocks to one or more data objects 440, and flushes the objects to the backend data service 550.

Prior to flushing the data objects 440 to the backend data service 550, the frontend data service 510 creates metadata that keeps track of the amount of data blocks received from the CVM 300 for each replicated snapshot, e.g., snapshot vdisk 470*a* as well as Δ snapshot vdisk 470*c*. The metadata associated with the snapshot (i.e., snapshot metadata 530) is recorded as an entry in persistent storage media (e.g., a persistent log 540) local to the frontend data service 510. The snapshot metadata 530 includes information describing the snapshot data, e.g., a logical offset range of the snapshot vdisk 470. In an embodiment, the snapshot metadata 530 is stored as an entry of the persistent log 540 in a format such as, e.g., snapshot ID, logical offset range of snapshot data, logical offset into the data object to support storing multiple extents into a data object, and data object ID. The frontend data service 510 updates the snapshot metadata 530 of the log entry for each data object 440 flushed to the backend data service 550 and maintains offset of the data object where extents of the snapshot are stored. Notably, the snapshot metadata 530 is used to construct the index data structure 600 of LTSS.

Illustratively, the index data structure 600 is configured to enable efficient identification (location) and retrieval of data blocks of the snapshots contained within numerous data objects 440 stored on the object store 460. Effectively, the index data structure acts as an independent database organized to retrieve data by extent of a vdisk (as recorded in the associated object store of the archival storage system) according to any snapshot. In essence, the index metadata structure is a searchable mapping of snapshot extents to objects (and offsets within those objects) of the object store. Notably, each snapshot is associated with a corresponding index data structure and may include incremental changes to a prior snapshot that may reference a prior index data structure associated with the prior snapshot. In this manner, only the incremental changes between snapshots need be stored in the archival storage system as indicated above, because later index data structures may reference (via prior index data structures) older blocks in prior snapshots.

Accordingly, the index data structure 600 may be extended to embody a plurality of "cloned," e.g., copy-on-write, index structures associated with many of the data objects 440 of LTSS 500 to enable the location and retrieval of the data blocks. To that end, a snapshot configuration repository 560 (e.g., database) is provided, e.g., on storage media local to the LTSS data services, to locate a snapshot index data structure that is dynamically query-able by the data services to select a snapshot (i.e., the repository is organized according to snapshot) and its corresponding index data structure 600 of a data object, e.g., from among the numerous (cloned) index data structures. Further, the repository 560 may also be stored on the object store 460 to ensure fault tolerance, durability, and availability.

In an embodiment, the snapshot configuration repository 560 is organized as a key-value store that provides a higher-level of indexing (i.e., higher than the actual index data structure) to resolve to a snapshot corresponding to a (cloned) index data structure used to retrieve one or more data blocks for data objects stored in the object store 460. The snapshot configuration repository 560 is managed separately from the object store (e.g., remote from the object store media) and points to roots of the (cloned) index structures associated with snapshot data objects (e.g., using a remote referencing mechanism such as a URL to a root node of a cloned index structure resident on object store media located on the network/internet.) Such remote referencing enables essentially infinite storage capacity of the LTSS object store, e.g., among various cloud service providers (CSPs) such as AWS, Google, Azure and the like, that is not limited by an address space (file space, namespace) of a (client) distributed file system. Note that the limited address space of such client file systems also limits the amount of "active" file system snapshots that can be maintained on the client's storage (such as a volume).

In an embodiment, the snapshot configuration repository 560 may be used as a search engine to enable efficient locating and retrieving of a data block from the selected object. Similar to the persistent log 540, the snapshot configuration repository 560 includes configuration information about each snapshot and associated data object as well as pointers to the roots of the index data structures for the data objects. The repository 560 may also be indexed by logical timestamp or VM/vdisk name of a snapshot. The snapshot may then be selected and a pointer to a root node of the corresponding index data structure 600 may be identified to access a specified logical offset range of a snapshot. Notably, the index data structure 600 is configured to translate (map) the logical offset range (address space) of data in the snapshot to the data object address space of the object store hosting the snapshot data to thereby enable efficient (i.e., bounded time) retrieval of the snapshot data from the object store independent of the number of snapshots.

Figure 6:
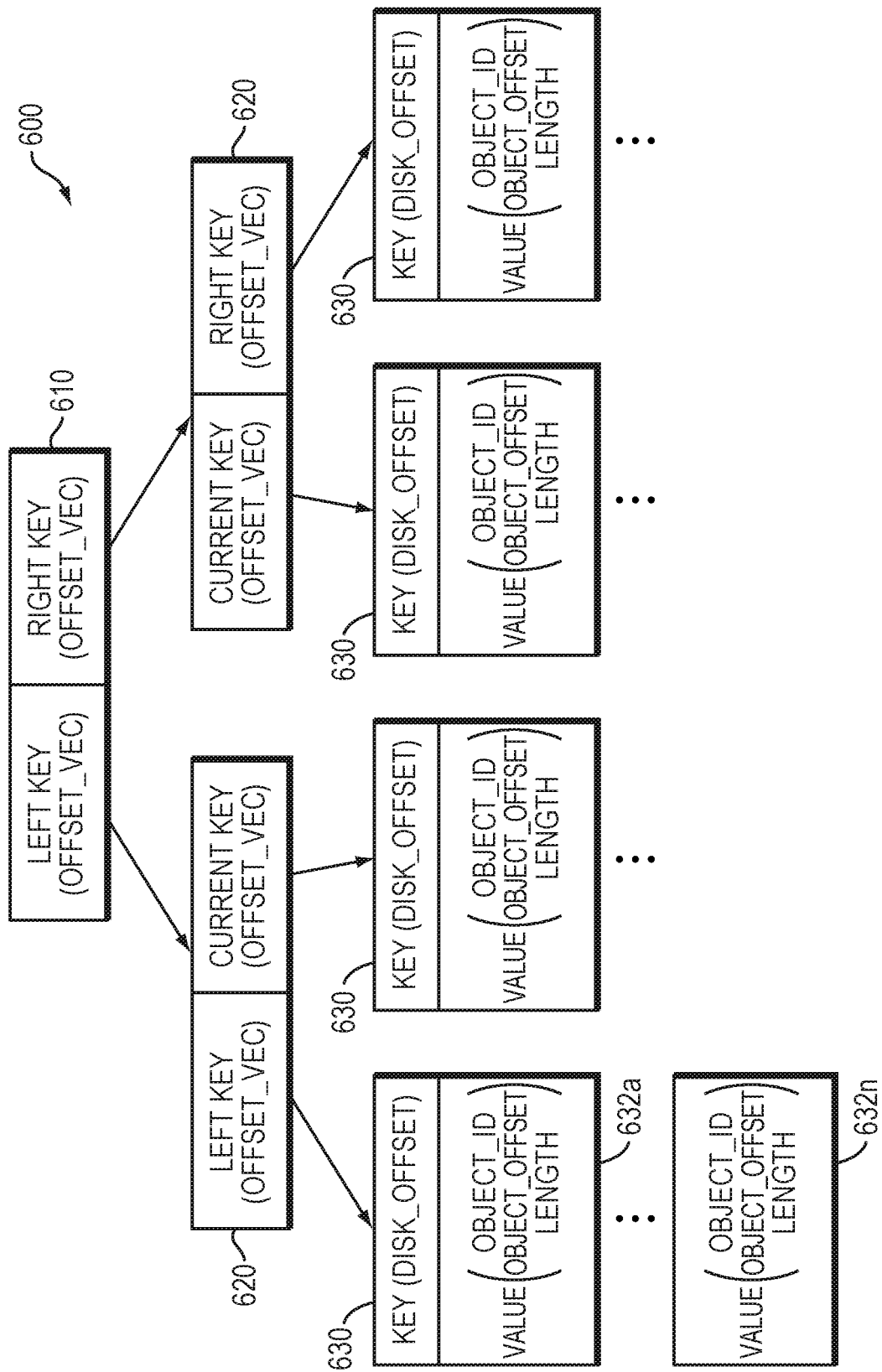
FIG. 6 is a block diagram illustrating an index data structure configured for efficient retrieval of snapshots from the LTSS of the archival storage system.

FIG. 6 is a block diagram illustrating the index data structure 600 configured for efficient retrieval of snapshots from the LTSS of the archival storage system. In one or more embodiments, the index data structure 600 is illustratively a balanced tree (e.g., a B+ tree) with a large branching factor for internal nodes to maintain a limited depth of the tree, although other types of data structures, such as bitmaps, heaps, and hashes, may be used with the embodiments described herein. When embodied as the B+ tree, the index data structure includes a root node 610, one or more intermediate (internal) nodes 620 and a plurality of leaf nodes 630. For the reference snapshot vdisk 470a, each internal node 620 contains a set of keys that specify logical offset ranges into the address space of the vdisk 470a and corresponding values that reference other nodes in the B+ tree (e.g., lower-level internal nodes or leaf nodes). Each leaf node 630 contains a vector of one or more values 632a-n describing (references embodied as descriptors) one or more data object(s) having the extent(s) that includes the selected data blocks corresponding to the specified logical offset range as well as a logical offset of the extent in the data object and length of the extent. In other words, a leaf node can be considered as a 4-tuple having: (i) a logical offset in the address space of the logical entity (e.g., snapshot), (ii) a data object id, (iii) a logical offset of the extent into the data object, and (iv) a length of the extent. The technique only requires traversing the depth of a (cloned) index data structure to find the leaf node 630 pointing to a selected data block of a particular snapshot within the address space of a data object in the object store. Notably, a large branching factor for nodes, e.g., 1024 for leaf nodes and 32×1024=32K for internal nodes, permits a very large number of references in the internal nodes 620 of the B+ tree so that a depth of the tree is reduced (e.g., to 2 or 3 levels) enabling an effective bounded traversal time from the root node to a leaf node (e.g., traverse at most 3 nodes to locate data in the object store). The address space covered by the leaf nodes is of variable length and depends upon a number of extents referenced according to the branching factor. In an embodiment, the internal nodes have a branching factor much larger than the leaf nodes to support a very large address space (e.g., given an extent size of less than 1 MB and a branching factor of 32K, a two-level B-tree can reference an address space as great as 16 exabytes).

In an embodiment, each internal node 620 contains keys and pointers to children nodes, and generally not any values. The root node 610 is a variant of the internal node 620 but similar to the internal node, contains disk offsets as keys. For each key, a left pointer points to data of the vdisk ranging from a left key to (and including) a current key; illustratively, data in a "child" internal node 620 for the left pointer embodies the form [left key, current key]. A right pointer points to data of the vdisk ranging from the current key to (but excluding) a right key; illustratively, data in a child internal node for the right pointer embodies the form [current key, right key]. The fields of the internal node illustratively include (i) Offset_Vec containing a list of offsets in the vdisk that function as a key; and (ii) Child_Pointer_Vec containing a pointer to a child node.

As indicated previously, the leaf node 630 contains a vector (e.g., predetermined number) of segment descriptors (e.g., up to 1024), each of which describes the vdisk address space covered by the descriptor corresponding to information in the form of the following keys and values forming the descriptor for locating data in the object store:

Key (Disk_Offset)→Value (Object_ID, Object_Logical_Offset, Length)

wherein Disk_Offset refers to the offset within the vdisk; Object_ID identifies the data object in the archival storage system and may be a combination of a vdisk uuid (universally unique identifier) and an assigned predefined (e.g., 64-bit integer) number; Object_Logical_Offset is the logical offset with the object (specified by Object_ID) at which the data resides; and Length is the number of contiguous bytes (size of the extent) beginning at "Offset" (Disk_Offset) that is pointed to by the key entry. Notably, additional keys may be used in the descriptor, such as the logical timestamp when the data was written and a snapshot identifier.

Referring to FIGS. 4 and 5, assume the CVM 300 generates the reference snapshot as snapshot vdisk 470a for vdisk 235 and having a size of 1 TB with an assigned vdisk ID of, e.g., 1. The CVM 300 replicates the data blocks of the snapshot vdisk 470a to the LTSS 500 in accordance with a first replication API call that identifies the vdisk ID 1 and the snapshot vdisk 470a as, e.g., snapshot ID 1. In response to receiving the first replication API call, the frontend data service 510 "buffers" the changed data blocks to a preferred size (e.g., 16 MB) of the object store and writes the blocks into a plurality of ("n") data objects 440 assigned, e.g., data object IDs 1-n. The frontend data service 510 also records snapshot metadata 530 describing the written data blocks (e.g., vdisk ID 1, snapshot ID 1, logical offset range 0-1 TB, data object IDs 1a-n) to the persistent log 540. After all of the data blocks are replicated and flushed to the object store 460, the frontend data service 510 constructs one or more index data structures 600 for the snapshot vdisk 470a (i.e., a parent B+ tree) using the appropriate snapshot metadata 430 for snapshot ID 1.

Assume that at the predetermined time interval, the CVM 300 generates a subsequent snapshot for the vdisk 235 (e.g., snapshot vdisk 470b) and after specifying snapshot 470a as a reference snapshot and performing the incremental computation, determines that the deltas (changes) of data blocks between the snapshot vdisks 470a,b lie in the offset range of 1 MB-5 MB and 1 GB-2 GB of the reference snapshot (e.g., snapshot vdisk 470a). Such deltas may be determined for a series of snapshots. For example, the CVM 300 may issue a second replication API call to the LTSS 500 that identifies the vdisk ID 1, a first snapshot vdisk 470*b* as, e.g., snapshot ID 2, and the logical offset range of 1 MB-5 MB for the changed data blocks. The CVM 300 then replicates the delta data blocks to the LTSS 500. In response to receiving the first replication API call, the frontend data service 510 buffers the changed data blocks to a preferred size (e.g., 16 MB) and writes the blocks into a data object 440 assigned, e.g., an object ID 2. The frontend data service 510 also records snapshot metadata 530 describing the written data blocks (e.g., vdisk ID 1, snapshot ID 2, logical offset range 1 MB-5 MB, object ID 2) to the persistent log 540.

After all of the changed data blocks are replicated and flushed to the object store 460, the frontend data service 510 constructs an index data structure 600 for the first snapshot vdisk 470*b* using the appropriate snapshot metadata 530 for snapshot ID 2. Assume the changed data blocks at the logical offset range 1 MB-5 MB of the snapshot vdisk 470*a* fit within the data object (extent) referenced by a leaf node 630 of the parent B+ tree. A new, updated copy of the leaf node may be created to reflect the changed data blocks at the logical offset range while the remaining leaf nodes of the parent B+ tree remain undisturbed. Updated copies of the internal node(s) 620 referencing the logical offset range of the changed data blocks described by the updated leaf node may likewise be created. A new "cloned" B+ tree is thus constructed based on the parent B+ tree using a copy-on-write technique. The cloned B+ tree has a new root node 610*a* and internal nodes 620 that point partially to "old" leaf nodes 630 of the parent B+ tree as well as to the new leaf node 630*a* (not shown). Illustratively, the leaf node 630*a* is copied and then modified to reference the changed data. Effectively, the cloned B+ tree for the first A snapshot vdisk 470*c* is a "first child" B+ tree that shares internal and leaf nodes with the parent B+ tree.

The CVM 300 thereafter issues a third replication API call to the LTSS 500 that identifies the vdisk ID 1, a second A snapshot vdisk 470*c* as, e.g., snapshot ID 3, and the logical offset range of 1 GB-2 GB for the changed data blocks. The CVM 300 replicates the delta data blocks to the LTSS 500. In response to receiving the third replication API call, the frontend data service 510 buffers the changed data blocks to a preferred size (e.g., 16 MB) and writes the blocks into "n" data objects 440 assigned, e.g., object IDs 3*a-n* (not shown). The frontend data service 510 records snapshot metadata 530 describing the written data blocks (e.g., vdisk ID 1, snapshot ID 3, logical offset range 1 GB-2 GB, object IDs 3*a-n*) to the persistent log 540. After all of the changed data blocks are replicated and flushed to the object store 460, the frontend data service 510 constructs one or more second child B+ trees for the second A snapshot vdisk, as described above. Notably, a large branch factor of the B+ tree permits a very large number of references in the internal nodes of the B+ tree to support a correspondingly large number of changes between snapshots so that the index structure depth of the tree may be maintained at a maximum depth (e.g., 2 to 3 levels) enabling rapid traversal time from the root node to a leaf node. That is, no matter how many snapshots exist, references to the oldest data remain referenced by the newest snapshot resulting in a fixed number of node traversals to locate any data.

Operationally, retrieval of data blocks (snapshot data) by the LTSS data services from any snapshot stored in the archival storage system involves fetching the root of the index (B+ tree) data structure 600 associated with the snapshot from the snapshot configuration repository 560, using the offset/range of the snapshot data block(s) to be retrieved as a key to traverse the tree to the appropriate leaf node 630, which points to the location of the data blocks in the data object 440 of the object store 460. For incremental restoration of snapshot data, the technique further enables efficient computation of differences (deltas) between any two snapshots using the index metadata rather than information within the snapshot itself. In this manner, a delta between any two snapshots no matter how far apart (i.e., independent of a number of intervening snapshots) may be computed without accessing metadata of the intervening snapshots. In an embodiment, the LTSS data services perform the delta computations by accessing the snapshot configuration repository 560, identifying the root nodes 610 of the corresponding index data structures 600 (e.g., B+ trees) for the two snapshots, and traversing their internal nodes 620 all the way to the leaf nodes 630 of the index data structures to determine any commonality/overlap of values. All leaf nodes 630 that are common to the B+ trees are thus eliminated, leaving the non-intersecting leaf nodes corresponding to the snapshots. The leaf nodes of each tree are traversed to obtain a set of <logical offset, object ID, object offset> tuples and these tuples are compared to identify the different (delta) logical offset ranges between the two snapshots. These deltas then may be accessed from the data objects and provided to a requesting client.

The embodiments described herein are directed to a technique configured to enable recovery of failover data (e.g., data processed by a user application) at an on-premises cluster (e.g., source) from one or more High Frequency Snapshots (HFSs) replicated to a cloud cluster (e.g., target) for storage and recovery in a backup/archival and/or disaster recovery (DR) environment. The target is illustratively an intermediary repository embodied as a long-term storage service (LTSS) configured to organize and store the HFSs as recovery points (RPs) in cloud storage, such as an object store. According to the technique, the LTSS stores a HFS identifier (ID), a logical timestamp (e.g., a timestamp corresponding to a time when the HFS was taken) and a logical offset (e.g., an offset in an object of the object store storing data of the HFS) associated with each replicated HFS as a key of a segment descriptor in a key-value database configured to store metadata describing the failover data of the HFS stored as a whole or part of one or more objects in the object store. Upon recovery of the user application in response to a disaster, the technique enables identification of the HFS stored in the object store and creation of a searchable HFS index metadata structure (B+ tree) for locating and retrieving (i.e., extracting) the identified HFS as a RP. Illustratively, LTSS uses the HFS ID and logical timestamp to create the index metadata structure of segment descriptors identifying and locating the HFS within the object store. The HFS index metadata structure is then used to hydrate and create the RP used to reconstitute the user application at the source.

In an embodiment, the source may include CVM 300 of DSF 250 configured to generate a full snapshot, e.g., a Low Frequency Snapshot (LFS) taken asynchronously, from the failover data, e.g., data processed by a user application running in the UVM 210. The data of the UVM 210 is virtualized as a disk (e.g., vdisk 235) and, upon generation of the LFS snapshot, is illustratively processed as snapshot vdisk 470 of the UVM 210. The snapshot vdisk 470 (LFS) is replicated periodically (e.g., every hour) to LTSS, which stores the LFS as a base snapshot in the object store. Upon finalization of the data transfer, LTSS 500 constructs an index data structure (e.g., a B+ tree) for the LFS, wherein the LFS index data structure 600 represents (i.e., maps or associates address ranges of the snapshot with objects in the object store having data corresponding to those address ranges) a LFS recovery point (RP). As noted, the index data structure 600 includes a root node 610, a plurality of internal nodes 620 and a plurality of leaf nodes 630 embodied as segment descriptors.

Between generation and replication of the LFS snapshots, the source may begin capturing and replicating subsequent data (i.e., after a time of the base snapshot) as incremental light weight snapshots (LWSs) of the failover data (e.g., accumulated changes as differential and/or incremental data to the base snapshot) to LTSS at a "high frequency." e.g., less than 60 seconds. The LWS is essentially a set of changes (change set) to the UVM application that is generated from an operations log (i.e., a sequential list of write operations denoted "op log") on the source. Illustratively, the oplog coalesces input/output (I/O) accesses, such as random write operations, directed to a virtual disk (vdisk) hosted by the source. The oplog temporarily stores (caches) data associated with the random write operations (i.e., write data) as well as metadata describing the write data. The metadata includes descriptors (i.e., pointers) to the write data stored on virtual address regions, i.e., offset ranges, of the vdisk and, thus, are used to identify the offset ranges of write data (i.e., write ranges) for the vdisk that are cached (captured) in the oplog. Notably, the source replicates the LWS snapshots periodically (e.g., every minute or second) to LTSS as High Frequency Snapshots (HFSs).

Figure 7:
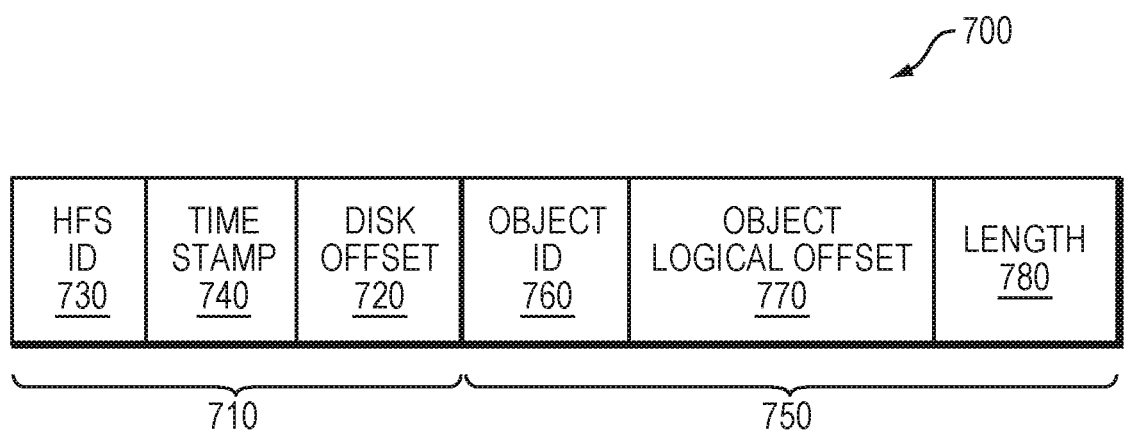
FIG. 7 is a block diagram of an exemplary segment descriptor of the index data structure used to identify a High Frequency Snapshot (HFS)

In an embodiment, LTSS 500 stores the write ranges of the HFSs as segment descriptors 700 in the key-value database, e.g., the snapshot configuration repository 560. FIG. 7 is a block diagram of an exemplary segment descriptor 700 including a key field 710 and a value field 750. As noted, the key field 710 includes a Disk_Offset 720 within the vdisk, and the value field 750 includes (i) an Object_ID 760 that identifies the data object in the archival storage system, (ii) an Object_Logical_Offset 770 that is the logical offset with the object at which the data resides; and (iii) a Length 780 that is the number of contiguous bytes beginning at the Disk_Offset pointed to by the key entry. According to the technique, the key field 710 of the segment descriptor is enhanced to include a HFS_ID 730 that identifies the HFS an a logical timestamp 740 (e.g., a timestamp corresponding to a time at the source when the HFS was taken) that allows removal of overwritten (redundant) or overlapping write ranges as well as reference (pointer) to valid write ranges of objects used to hydrate a HFS RP. Note that a logical timestamp corresponds to a time when data was originally recorded and possibly overwritten at the source so that the logical timestamp may be used to prune overwritten data at a later time.

When recovery of a RP is triggered for a previous point in time, the HFS_ID 730 is provided to LTSS 500, which scans the snapshot configuration repository 560 based on the HFS_ID 730 to collect all segment descriptors 700 that match the HFS_ID key 730. The collected segments are used to construct the index data structure (HFS B+ tree), which essentially synthesizes the RP at the desired point in time. That is, the B+ tree index structure for a HFS_ID 730 is generated by LTSS 500 using the scanned segment descriptors. Illustratively, the collected segment descriptors are applied to an associated base snapshot (LFS) to create the HFS RP used to recover the lost data up to the desired point in time.

LTSS 500 illustratively implements the technique to (i) efficiently store the failover data of the HFS received from the source as a RP on the object store 460, (ii) efficiently store index metadata describing the stored RP on the snapshot configuration repository 560, and (iii) construct an index data structure from the index metadata for retrieval of the RP to recover the failover data and instantiate the UVM/application for execution on the source. The technique is thus directed to creation of a HFS RP from one or more HFSs (LWSs) by scanning the snapshot configuration repository 560 (key-value database) from matching HFS_IDs 730 of segment descriptor keys and using the matching segment descriptors to construct a HFS index data structure (B+ tree). Once constructed, a copy of the HFS index B+ tree is stored locally by LTSS in the snapshot configuration repository 560 and another copy of the tree is stored in the object store 460 (for retrieval in the event of failure/disaster).

Figure 8:
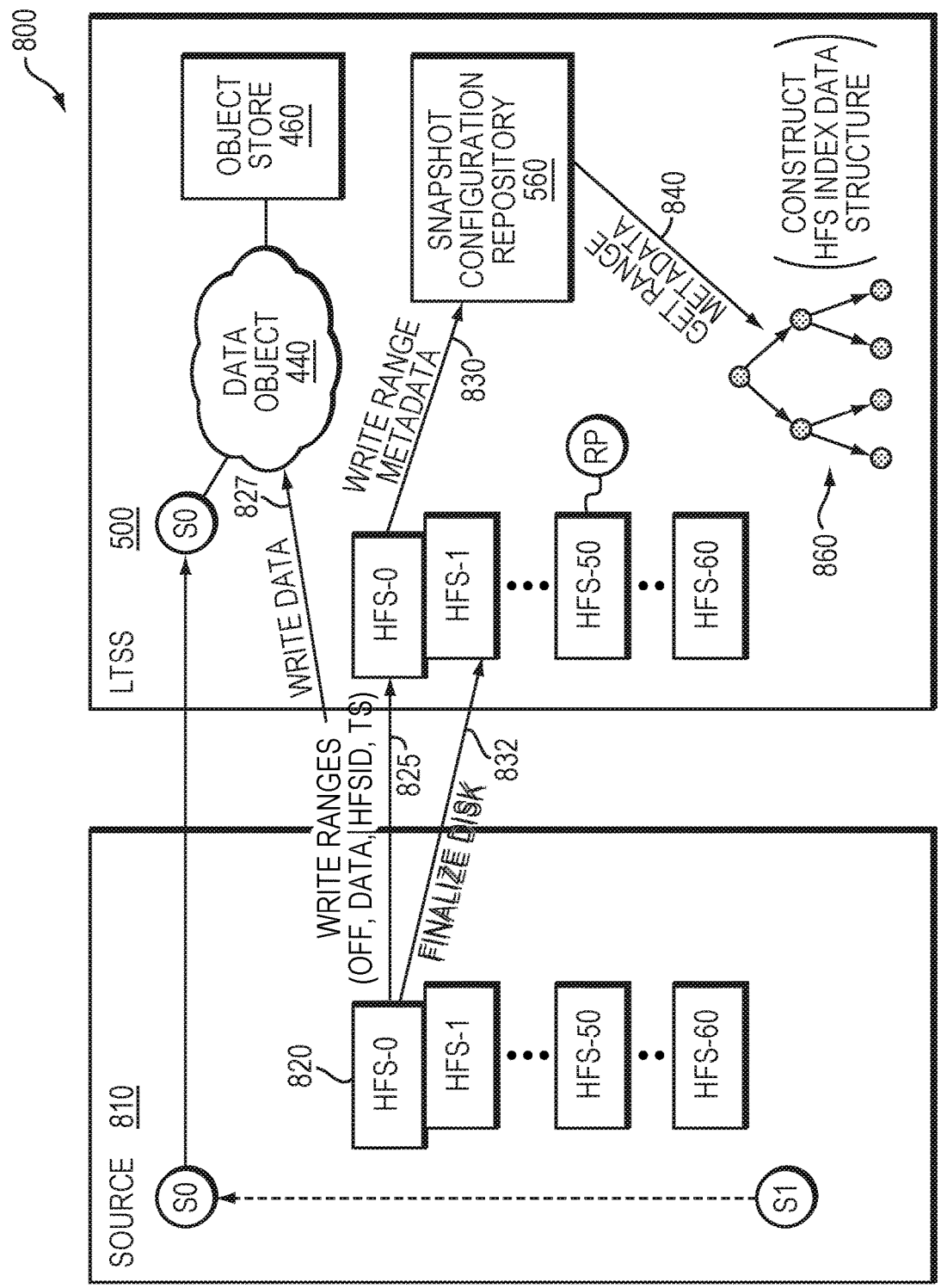
FIG. 8 is a data flow diagram illustrating steady-state replication of the HFS from a source to a target.

FIG. 8 is a data flow diagram illustrating "steady-state" replication 800 of HFSs from an on-premises cluster (source) to the LTSS (target) in the cloud. The source 810 generates and replicates full asynchronous replication snapshots periodically (e.g., every one hour) to LTSS 500 as LFS (e.g., S0, S1). LTSS stores the data of S0 and S1 as data objects 440 in object store 460. For HFS, snapshot replication (transmission) is more frequent, e.g., every minute or second the source 810 may transfer a LWS (HFS 820) to LTSS. As change sets, the HFSs 820 embody write operations that have occurred on the protected entity (data processed by UVM application). Illustratively, the HFS transmission 825 is embodied as write ranges of data at a particular offset, e.g., WriteRanges (offset, data, HFS ID, logical timestamp), as well as write data 827 written to the data object 440. In response to a completion or finalization command (API call) 832, LTSS 500 generates metadata describing the write ranges (write range metadata 830) to S0 and S1 and records the metadata 830 as data structures (e.g., segment descriptors 700) on the key-value database (snapshot configuration repository 560). The HFS ID 730 identifies the HFS 820 to keep track of the HFS transmissions 825, whereas the logical timestamp (ts) 740 is used to track the order of the writes so as to provide for culling (e.g., removing) overwritten data. That is, the logical timestamp 740 associated with each HFS "change set" transmission 825 is used to ensure that the latest overlapping (redundant) write range of multiple write ranges is recorded in the segment descriptors 700. When a redundant write range associated with HFS_ID is detected, the technique maintains (preserves) the last (latest) timestamped HFS transmission for the write (offset range) of the HFS so that overwritten data may be discarded (ignored).

Since the data of a HFS 820 is stored in the object store, the technique is directed to creating index metadata (i.e., an index data structure 600) to hydrate and create a full snapshot (e.g., RP) for the HFS on-demand or periodically. That is, in response to a request by the source to recover a RP for the protected entity, LTSS constructs an HFS index tree by scanning the segment descriptors 700 in the key-value database (snapshot configuration repository 560) to match keys, e.g., HFS_ID 730, of the descriptors for the RP. The matching segment descriptors are retrieved and packed into leaf nodes 630 of the index tree. In a background process, a garbage collection (GC) service deletes all unreferenced objects, e.g., references to overwritten address ranges and data are discarded.

Assume there is a plurality of write ranges (e.g., 1000) in a change set associated with HFS-1 that is loaded in segment descriptors 700 stored in the snapshot configuration repository 560. The technique provides an additional key field for HFS_ID1 730 in those segment descriptors 700. Assume also that there is a plurality of write ranges (e.g., 1000) associated with each of HFS_ID2-60 that is loaded in segment descriptors 700 stored in the snapshot configuration repository 560 and that HFS_ID2-60 is loaded into respective additional key fields 730 in those descriptors. Note that each segment descriptor 700 is associated with a vdisk range (e.g., disk offset) of the HFS 820.

The source 810 then issues a request to LTSS 500 to finalize (reconstitute) a recovery point (RP) for a particular HFS_ID, e.g., HFS-50. LTSS 500 scans the segment descriptors 700 in the repository 560 from HFS_ID1 to HFS_ID50 (e.g., GetRange API call for metadata 840) and retrieves those segments 700 with keys 730 matching the HFS_IDs. The retrieved segment descriptors are used to create index metadata (e.g., an index B+ tree) for the RP. Note that the data for the RP is already fully hydrated (i.e., stored) in the object store 460 and that the technique is directed to creating metadata describing the RP, i.e., identifying the data blocks of the data objects 440 in the object store 460 storing the RP. To that end, the technique creates an HFS index data structure 860 (B+ tree) associated with a HFS to locate and retrieve those data blocks so as to constitute the RP.

Figure 9:
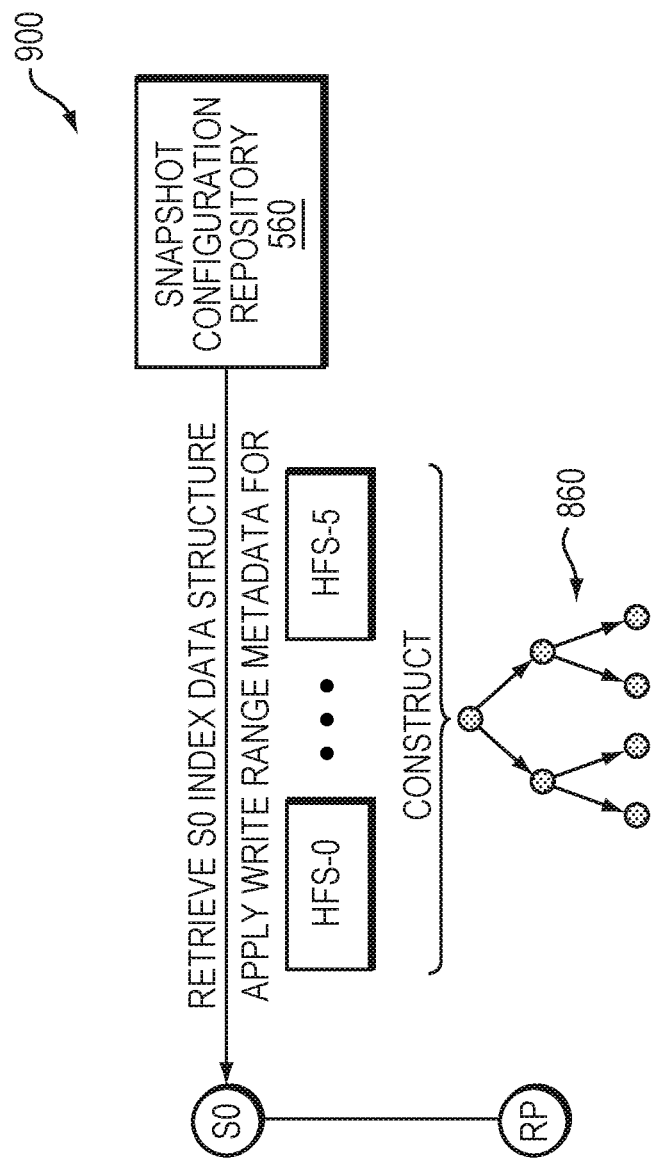
FIG. 9 is a data flow diagram illustrating on-demand hydrating of the HFS.

FIG. 9 is a data flow block diagram illustrating "on-demand" hydrating 900 of the HFS. Assume the source 810 issues a request to LTSS 500 to recover data of a RP for HFS_ID-5, which is illustratively associated with base snapshot S0. LTSS 500 retrieves the index data structure 600 (B+ tree) associated with S0 (e.g., a LFS) and scans the segment descriptors 700 of the snapshot configuration repository 560 searching for keys 730 that match HFS_IDs 0-5 associated with S0. LTSS 500 then applies the write range metadata for HFS_IDs 0-5 on top of the S0 B+ tree (index data structure 600) to construct HFS index data structure 860. For example, LTSS 500 retrieves the root node of the S0 B+ tree 600 from the repository 560 and traverses the tree to the leaf node(s) 630 based on HFS_ID 0-5 to determine the object ID 760 and logical object offset 770 of the associated data in the object store 460 used to construct the HFS index data structure 860. LTSS 500 then retrieves the data from the object store 460, reconstitutes the RP and transfers the RP to the source 810. In an embodiment, the source 810 may invoke functionality to perform either early or late cutover to restore the RP at the source. Later cutover requires that the source retrieve all of the data of the RP from LTSS 500 before instantiating the protected entity (UVM application), whereas early cutover enables on-demand fetching to retrieve only the data requested by the application from LTSS.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving data of a high-frequency snapshot (HFS) of a logical entity from a source data service at an archival storage system according to segments of address ranges of the logical entity as recorded in a persistent log storing the HFS;
constructing a configuration repository associating each segment with a descriptor having a key including a snapshot identifier (ID);
in response to triggering a recovery point,
(i) scanning the configuration repository based on the snapshot ID to collect descriptors associated with the snapshot ID; and
(ii) constructing a searchable index data structure based on the collected descriptors to represent the recovery point, wherein the searchable index data structure maps each segment address range to an object in the archival storage system, and wherein the searchable index data structure is used to hydrate the recovery point at a target data service.

2. The method of claim 1, wherein the key further includes a logical timestamp indicating a time that a respective segment was recorded in the persistent log, the logical timestamp used to cull any overwritten portions of the respective segment.

3. The method of claim 1, wherein each descriptor includes an address range within an address space of the logical entity.

4. The method claim 1, wherein the configuration repository is stored at one of the source data service or the archival storage system.

5. The method of claim 1 wherein a high-frequency recovery point interval of the HFS is less than or equal to one minute.

6. The method of claim 1, wherein receiving the data of the HFS of the logical entity from the source data service at the archival storage system uses incremental snapshot replication.

7. The method of claim 1, wherein a low frequency snapshot of a base snapshot for the HFS is repeated at an interval that is at a lower frequency than is repeated for the HFS.

8. The method of claim 7 wherein the low-frequency snapshot interval is at least 60 minutes and is used as the base snapshot for the HFS repeated at a high-frequency recovery point interval of a minute or less.

9. The method of claim 1, wherein the searchable index data structure is constructed from data of two or more incrementally replicated high frequency snapshots to the archival storage system.

10. The method of claim 1, wherein the searchable index data structure has a branching factor to maintain a maximum depth of 3 levels independent of a number of snapshots.

11. The method of claim 1, wherein the received data at the archival storage system is organized into blocks according to a preferred size of the archival storage system.

12. A non-transitory computer readable medium including program instructions for execution on a processor, the program instructions configured to:
receive data of a high-frequency snapshot (HFS) of a logical entity from a source data service at an archival storage system according to segments of address ranges of the logical entity as recorded in a persistent log storing the HFS;
construct a configuration repository associating each segment with a descriptor having a key including a snapshot identifier (ID);

in response to triggering a recovery point,
  (i) scan the configuration repository based on the snapshot ID to collect descriptors associated with the snapshot ID; and
  (ii) construct a searchable index data structure based on the collected descriptors to represent the recovery point, wherein the searchable index data structure maps each segment address range to an object in the archival storage system, and wherein the searchable index data structure is used to hydrate the recovery point at a target data service.

13. The non-transitory computer readable medium of claim 12, wherein the key further includes a logical timestamp indicating a time that a respective segment was recorded in the persistent log, the logical timestamp used to cull any overwritten portions of the respective segment.

14. The non-transitory computer readable medium of claim 12, wherein each descriptor includes an address range within an address space of the logical entity.

15. The non-transitory computer readable medium of claim 12, wherein the configuration repository is stored at one of the source data service or the archival storage system.

16. The non-transitory computer readable medium of claim 12, wherein a high-frequency recovery point interval of the HFS is less than or equal to one minute.

17. The non-transitory computer readable medium of claim 12 wherein the program instructions configured to receive the data of the HFS of the logical entity from the source data service at the archival storage system are further configured to use incremental snapshot replication.

18. The non-transitory computer readable medium of claim 12, wherein a low frequency snapshot of a base snapshot for the HFS is repeated at an interval that is at a lower frequency than is repeated for the HFS.

19. The non-transitory computer readable medium of claim 18, wherein the low-frequency snapshot interval is at least 60 minutes and is used as the base snapshot for the HFS repeated at a high-frequency recovery point interval of a minute or less.

20. The non-transitory computer readable medium of claim 12, wherein the searchable index data structure is constructed from data of two or more incrementally replicated high frequency snapshots to the archival storage system.

21. The non-transitory computer readable medium of claim 12, wherein the searchable index data structure has a branching factor to maintain a maximum depth of 3 levels independent of a number of snapshots.

22. The non-transitory computer readable medium of claim 12, wherein the received data at the archival storage system is organized into blocks according to a preferred size of the archival storage system.

23. An apparatus comprising:
  a long-term storage service (LTSS) of an archival storage system, the LTSS configured to execute on a processor that is further configured to execute program instructions to,
    receive data of a high-frequency snapshot (HFS) of a logical entity from a source data service at an archival storage system according to segments of address ranges of the logical entity as recorded in a persistent log storing the HFS;
    construct a configuration repository associating each segment with a descriptor having a key including a snapshot identifier (ID);
    in response to triggering a recovery point,
      (i) scan the configuration repository based on the snapshot ID to collect descriptors associated with the snapshot ID; and
      (ii) construct a searchable index data structure based on the collected descriptors to represent the recovery point, wherein the searchable index data structure maps each segment address range to an object in the archival storage system, and wherein the searchable index data structure is used to hydrate the recovery point at a target data service.

24. The apparatus of claim 23, wherein the key further includes a logical timestamp indicating a time that a respective segment was recorded in the persistent log, the logical timestamp used to cull any overwritten portions of the respective segment.

25. The apparatus of claim 23, wherein each descriptor includes an address range within an address space of the logical entity.

26. The apparatus of claim 23, wherein the configuration repository is stored at one of the source data service or the archival storage system.

27. The apparatus of claim 23, wherein a high-frequency recovery point interval of the HFS is less than or equal to one minute.

28. The apparatus of claim 23 wherein the program instructions to receive the data of the HFS of the logical entity from the source data service at the archival storage system further include program instructions to use incremental snapshot replication.

29. The apparatus of claim 23, wherein a low frequency snapshot of a base snapshot for the HFS is repeated at an interval that is at a lower frequency than is repeated for the HFS.

30. The apparatus of claim 29, wherein the low-frequency snapshot interval is at least 60 minutes and is used as the base snapshot for the HFS repeated at a high-frequency recovery point interval of a minute or less.

31. The apparatus of claim 23, wherein the searchable index data structure is constructed from data of two or more incrementally replicated high frequency snapshots to the archival storage system.

32. The apparatus of claim 23, wherein the searchable index data structure has a branching factor to maintain a maximum depth of 3 levels independent of a number of snapshots.

33. The apparatus of claim 23, wherein the received data at the archival storage system is organized into blocks according to a preferred size of the archival storage system.

* * * * *